US012741678B2

(12) United States Patent
Felip Leon et al.

(10) Patent No.: US 12,741,678 B2
(45) Date of Patent: Sep. 22, 2026

(54) HUMAN-ROBOT COLLABORATION

(71) Applicant: Intel Corporation, Santa Clara, CA (US)

(72) Inventors: Javier Felip Leon, Hillsboro, OR (US); Leobardo Campos Macias, Guadalajara (MX); David Israel Gonzalez Aguirre, Hillsboro, OR (US); David Gomez Gutierrez, Tlaquepaque (MX); Rafael De La Guardia Gonzalez, Guadalajara (MX); Nilesh Ahuja, Cupertino, CA (US); Ranganath Krishnan, Hillsboro, OR (US); Anthony Kyung Guzman Leguel, Guadalajara (MX); Jose Ignacio Parra Vilchis, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 17/134,331

(22) Filed: Dec. 26, 2020

(65) Prior Publication Data

US 2021/0309264 A1 Oct. 7, 2021

(51) Int. Cl.
*B60W 60/00* (2020.01)
*B25J 9/16* (2006.01)
(Continued)

(52) U.S. Cl.
CPC ...... *B60W 60/00276* (2020.02); *B25J 9/1653* (2013.01); *G05B 13/048* (2013.01);
(Continued)

(58) Field of Classification Search
CPC ... B60W 60/00276; B60W 2554/4026; B60W 2554/4029; B60W 2554/4046; B60W 2554/406; B60W 2556/10; B60W 2556/45; B60W 60/0027; B25J 9/1653; B25J 9/1666; G05B 13/048; G05B 2219/40202; G05B 2219/40476; G05D 1/0214
See application file for complete search history.

(56) References Cited

U.S. PATENT DOCUMENTS

2015/0210311 A1* 7/2015 Maurer ................ B60W 10/20
701/41
2020/0180647 A1* 6/2020 Anthony ................. G06N 3/08
(Continued)

OTHER PUBLICATIONS

V. Villani, et al. "Survey on Human-Robot Collaboration in Industrial Settings: Safety, Intuitive Interfaces and Applications", Mechatronics 55 (2018), pp. 248-266.
(Continued)

*Primary Examiner* — Dylan M Katz
(74) *Attorney, Agent, or Firm* — Banner & Witcoff, Ltd.

(57) ABSTRACT

A human-robot collaboration system, including at least one processor; and a non-transitory computer-readable storage medium including instructions that, when executed by the at least one processor, cause the at least one processor to: predict a human atomic action based on a probability density function of possible human atomic actions for performing a predefined task; and plan a motion of the robot based on the predicted human atomic action.

24 Claims, 7 Drawing Sheets

(51) Int. Cl.
*G05B 13/04* (2006.01)
*G05D 1/00* (2024.01)

(52) U.S. Cl.
CPC ... *G05D 1/0214* (2013.01); *B60W 2554/4026* (2020.02); *B60W 2554/4029* (2020.02); *B60W 2554/4046* (2020.02); *B60W 2554/406* (2020.02); *B60W 2556/10* (2020.02); *B60W 2556/45* (2020.02)

(56) References Cited

U.S. PATENT DOCUMENTS

| | | | | |
|---|---|---|---|---|
| 2020/0283016 | A1* | 9/2020 | Blaiotta | B60W 60/0011 |
| 2020/0293041 | A1* | 9/2020 | Palanisamy | G06N 3/045 |
| 2021/0171061 | A1* | 6/2021 | Etesami | B60W 30/0956 |
| 2021/0182604 | A1* | 6/2021 | Anthony | G05D 1/0088 |
| 2022/0297304 | A1* | 9/2022 | Stramandinoli | G06N 7/01 |
| 2023/0004846 | A1* | 1/2023 | Dalli | G06N 5/045 |
| 2023/0257003 | A1* | 8/2023 | Malekmohammadi | G06V 10/82 382/104 |

OTHER PUBLICATIONS

KUKA Robotics Corporation "Human-Robot Collaboration: Welcome, Fellow Robot!".
K. Wurm, et al.," OctoMap: A Probabilistic, Flexible, and Compact 3D Map Representation for Robotic Systems".
E. Wan, et al. "The Unscented Kalman Filter for Nonlinear Estimation" Oregon Graduate Institute of Science & Technology 2000.
I. Sucan, et, al. "The Open Motion Planning Library", IEEE Robotics & Automation Magazine, Dec. 2012.
W.K. Hastings, "Monte Carlo Sampling Methods Using Markov Chains and Their Applications", Biometrika (1970), 57,1 p. 97.
M.D. McKay, et al. "Comparison of Three Methods for Selecting Values of Input Variables in the Analysis of Output from a Computer Code", technometrics, vol. 21, No. 2, May 1979.
J. Felip, et al., "Manipulation Primitives: A Paradigm for Abstraction and Execution of Grasping and Manipulation Tasks", Robotics and Autonomous Systems 61 (2013) pp. 283-296.
H. Costelha, et al. "Robot Task Plan Representation by Petri Nets: Modelling, Identification, Analysis and Execution", Auton Robot (2012) 33; 337-360.

* cited by examiner

FIG 1

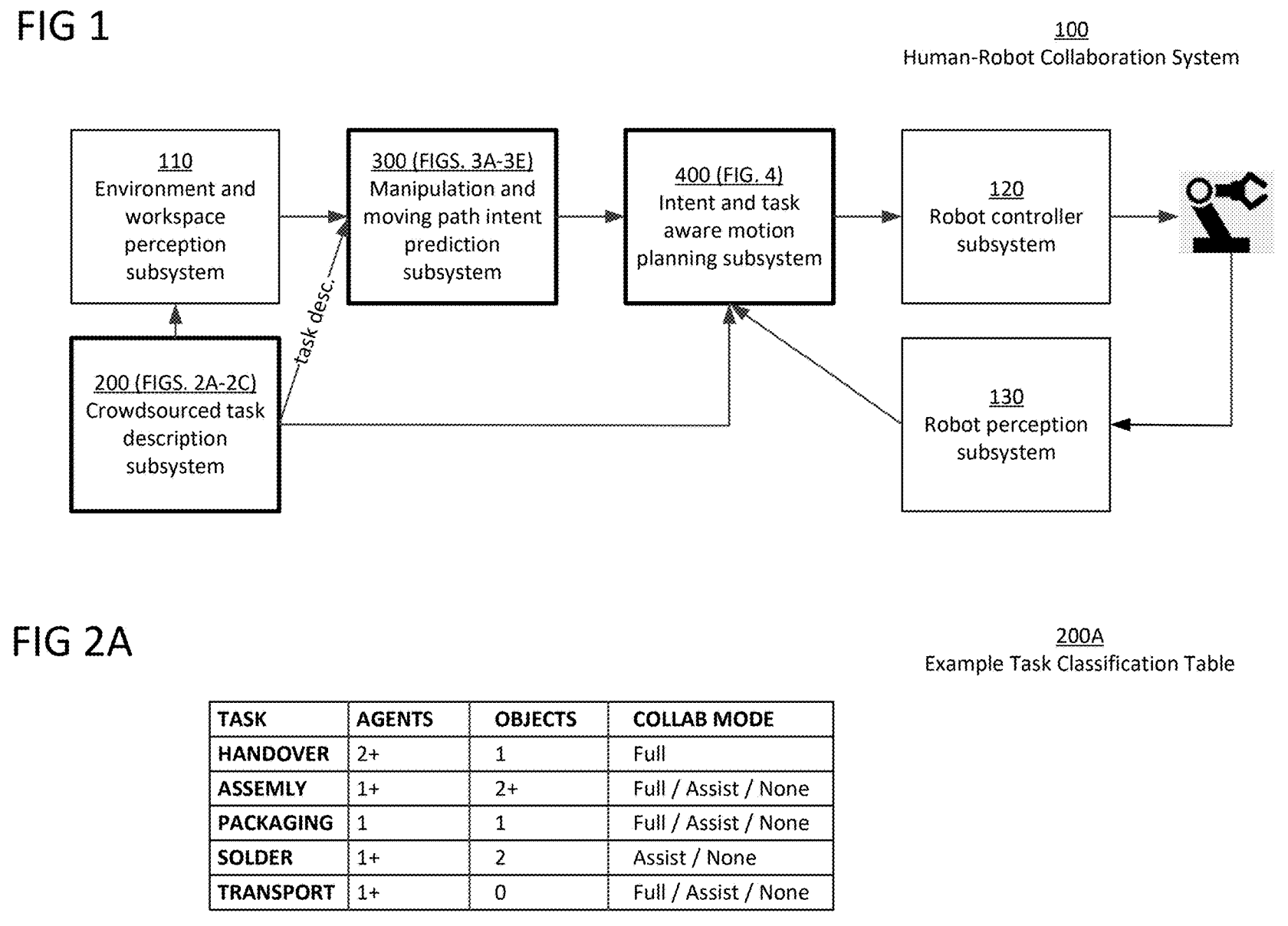

100
Human-Robot Collaboration System

110
Environment and workspace perception subsystem 300 (FIGS. 3A-3E)
Manipulation and moving path intent prediction subsystem 400 (FIG. 4)
Intent and task aware motion planning subsystem 120
Robot controller subsystem 200 (FIGS. 2A-2C)
Crowdsourced task description subsystem task desc.

130
Robot perception subsystem

FIG 2A

200A
Example Task Classification Table

| TASK | AGENTS | OBJECTS | COLLAB MODE |
| --- | --- | --- | --- |
| HANDOVER | 2+ | 1 | Full |
| ASSEMLY | 1+ | 2+ | Full / Assist / None |
| PACKAGING | 1 | 1 | Full / Assist / None |
| SOLDER | 1+ | 2 | Assist / None |
| TRANSPORT | 1+ | 0 | Full / Assist / None |

200B
Assembly Task Example
Start
200B.1
Find task objects
200B.2
Pose
Is reachable?
200B.4.1
Grasp
Direction
Grip force
200B.4.2
Transport
Pose
200B.4.3
Place + release
Direction
Contact force
Done
200B.3.1
Grasp
Direction
Grip force
200B.3.2
Transport
Pose
200B.3.3
Place + release
Direction
Contact force 200C
Example formal task definition via an extended probabilistic petri-like network
$p_0$
$p_1$
$p_2$
$p_3$
$p_4$
$p_E$
$K_{0,1}$
$K_{1,2}$
$K_{1,3}$
$K_{2,4}$
$K_{3,4}$
$K_{4,0}$
$\psi_{4,0}$

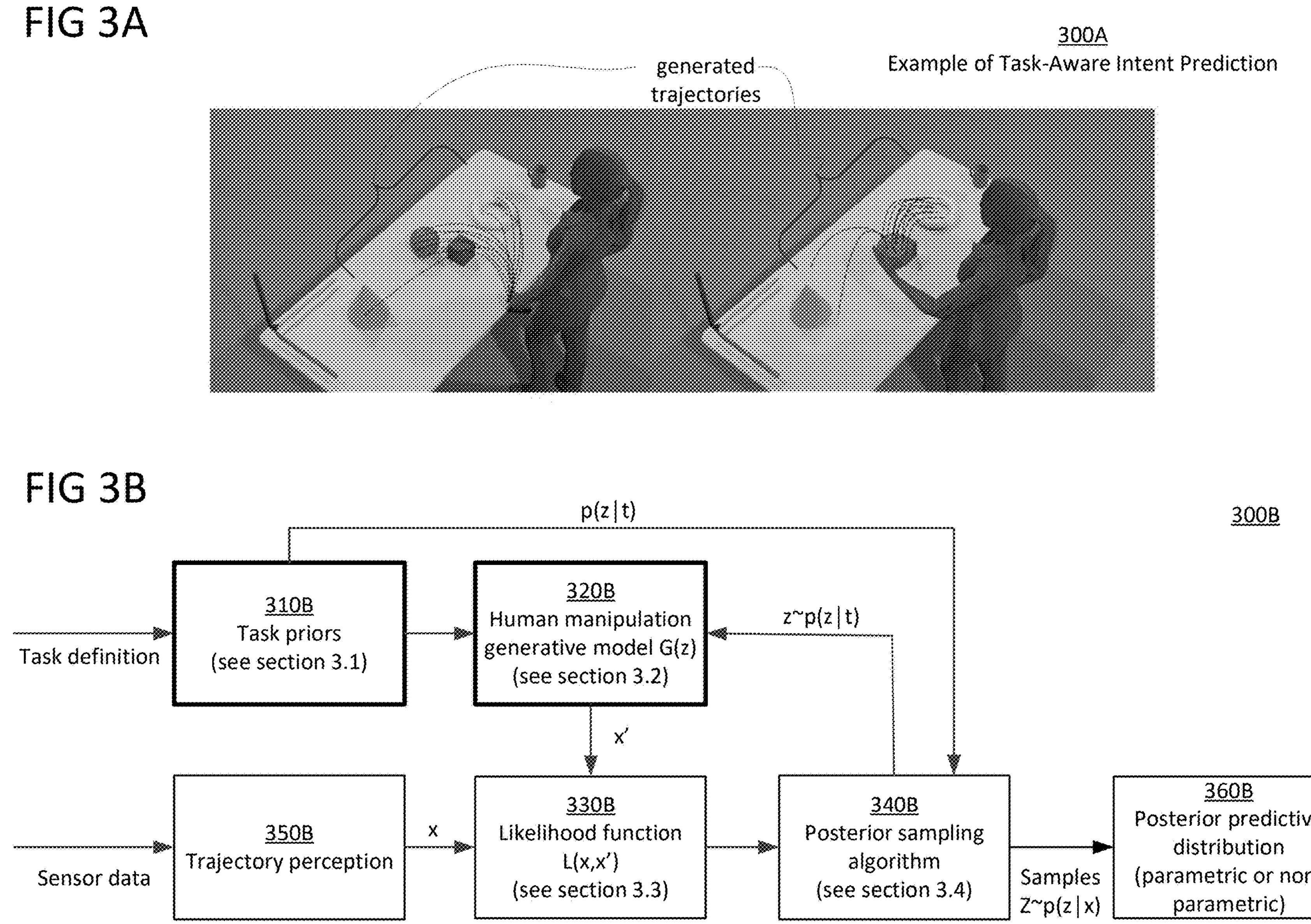
FIG 3A
300A
Example of Task-Aware Intent Prediction
generated trajectories
FIG 3B
300B
p(z|t)
Task definition
310B
Task priors
(see section 3.1)
320B
Human manipulation
generative model G(z)
(see section 3.2)
z~p(z|t)
x'
Sensor data
350B
Trajectory perception
x
330B
Likelihood function
L(x,x')
(see section 3.3)
340B
Posterior sampling
algorithm
(see section 3.4)
Samples
Z~p(z|x)
360B
Posterior predictive
distribution
(parametric or non-
parametric)

300C
Task Priors for Task Including Placing Ball Inside Torus

300D
Local Dynamic Map Enhanced with Goal Predictor

300E

Example of Trajectory Generation Approach When Executing a Navigation Task

400

Example of Human-Robot Collaboration Workspace with Multiple Sensors

Cam 0
Cam 1
Cam 2
Cam 3
Cam 4
Cam 5
Cam 6
Cam 7
Task frame
Cobot
Task objects

HUMAN-ROBOT COLLABORATION

TECHNICAL FIELD

Aspects described herein generally relate to autonomous robots and, more particularly, to autonomous robots operating in proximity to or in cooperation with humans.

BACKGROUND

There is increasing interest in robots working in proximity with humans where autonomous robots are required to operate not only safely among humans, but also cooperatively. Such a level of autonomy requires the robots to anticipate movement of people in its surroundings. Since the movement of people is governed by context, having robots with models of such context is important. However, it is often the case that the robots have short observation windows. For such situations, it is therefore desirable to gather and share relevant contextual information about the environment with robots that share a similar or same environment.

Known cooperative robots are mainly used to perform basic tasks, such as helping operators move materials or holding heavy objects. In these working scenarios, the robot's role is to be a tool that eases the operator's burden of physical labor with little autonomy. The lack of better human-robot collaboration limits application of robots to simplified versions of tasks like handling, welding, and assembly. Flexible and reliable handover of tools and goods in the production line has not be realized due to the lack of an efficient and generic intent estimation mechanism which can be easily coupled to the motion planning of the robots in a constrained time window.

BRIEF DESCRIPTION OF THE DRAWINGS

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

In the drawings, like reference characters generally refer to the same parts throughout the different views. The drawings are not necessarily to scale, emphasis instead generally being placed upon illustrating the principles of the disclosure.

FIG. 1 illustrates a human-robot collaboration system in accordance with aspects of the disclosure.

FIGS. 2A-2C illustrate a crowdsourced task descriptions subsystem 200 in accordance with aspects of the disclosure. FIG. 2A illustrates a task classification table. FIG. 2B illustrates an example of an assembly task. FIG. 2C illustrates an example of a formal task definition via an extended probabilistic petri-like network 200C.

FIGS. 3A-3E illustrate manipulation and moving path intent prediction subsystem in accordance with aspects of the disclosure. FIG. 3A illustrates an example of task-aware intent prediction. FIG. 3B illustrates a block diagram of prediction generation. FIG. 3C illustrates task priors for a task including placing a ball inside a torus. FIG. 3D illustrates a schematic diagram of a local dynamic map enhanced with a goal predictor. FIG. 3E illustrates an example of a trajectory generation approach when executing a navigation task.

DESCRIPTION OF THE ASPECTS

Figure 2B:
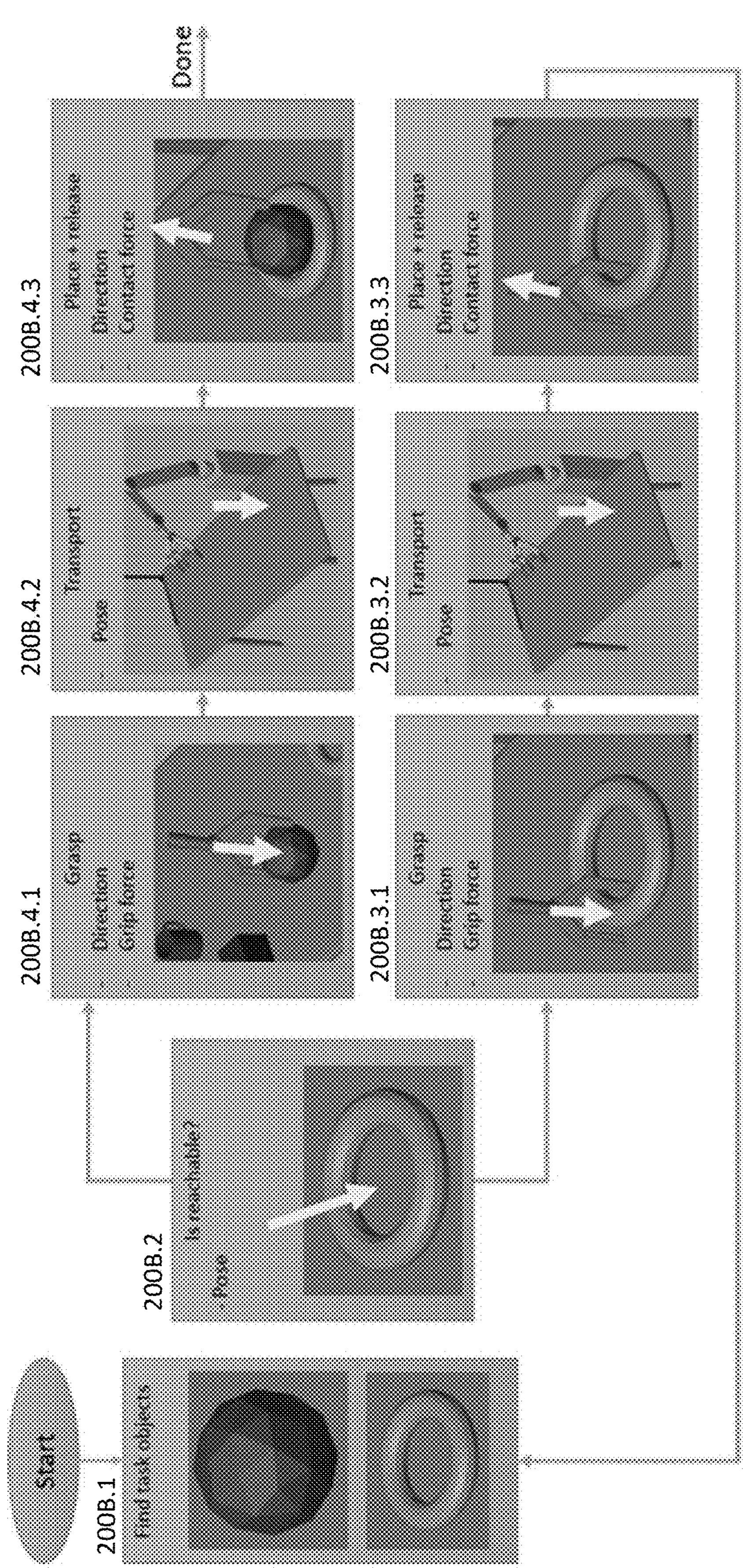

Scenarios where an efficient human-robot collaboration is important include autonomous driving in urban environments, and collaborative robots in factories.

Autonomous vehicles in urban environments have a main challenge in sharing the road with unmotorized users, such as pedestrians and cyclists. Besides detection, it is important to anticipate the unmotorized users' next actions to plan accordingly. Accurate intent and trajectory prediction of road users can be leveraged by vehicle navigation and planning systems to generate more secure and efficient motions. However, vehicles normally have low contextual information due to their short observation time window. Contextual information, combined with motion models, allows trajectory prediction of unmotorized road users. This context is relevant because the layout, the behavior of the users, and the rules change as the robot navigates different areas.

Collaborative robots in factories are trending towards a relaxation in spatial constraints that these industrial robots currently face, such as physical boundaries or sensors called light curtains. Due to the removal of such robot cells and motion detection systems that shut down robots upon human entering the robot space, there is an opportunity to have robots that are more mobile, that can be repurposed for different tasks without disregarding safety, and can actively cooperate with humans to increase the overall productivity by developing specific tasks with a shared autonomy.

Such collaborative applications require a new set of algorithms and frameworks to provide efficiency, precision, and safety. For instance, when humans perform manipulation tasks in a collaborative manner, where the workspace is shared and the common task is well known for both (e.g., packaging, sorting, or assembly), safe and efficient collaboration is achieved due to a combination of task knowledge, discrete event supervisory algorithms, and compliant control driven by accurate predictions.

Deciding which actions to execute next based on predictions of what the people in the environment are going to do next, and to plan accordingly for safe and efficient operations is not present in current applications. In factories, current collaborative tasks require the human to manually hand-over control of the task to the robot. The aspects of this disclosure provide a solution to such human-robot collaborative task problems.

1. Overview

FIG. 1 illustrates a human-robot collaboration system 100.

The human-robot collaboration system 100 comprises a crowdsourced task description subsystem 200, an environment and workplace perception subsystem 110, a manipulation and moving path intent prediction subsystem 300, an intent and task aware motion planning subsystem 400, robot controller subsystem 120, and a robot perception subsystem 130.

This disclosure focuses on gathering situational knowledge via crowdsourcing by the crowdsourced task description subsystem 200 (Section 2 and FIGS. 2A-2C), coordinated intent prediction by the manipulation and moving path intent prediction subsystem 300 (Section 3 and FIGS. 3A-3E), and task-aware motion-planning by the intent and task aware motion planning subsystem 400.

Probabilistic human manipulation intent is predicted, and then the motion planning extends existing motion planning algorithms to use the predicted probabilistic human intent to produce action plans that will result in more effective human-robot collaboration tasks. Human intent is predicted using perception systems, generative models based on task knowledge, and probabilistic approximate inference. The prediction, which is represented by a probability density function, is used to inform motion planning algorithms that generate human-intent aware motion plans. The motion planning algorithms also consider probabilistic intent representations. The use of motion planners that adapt to the task and what a collaborating human is doing will result in more effective human robot collaboration, reducing the time taken to perform the task, and increasing safety by having a robot that is able to move according to the predictions of the interacting humans. Finally, the crowdsourcing of behavioral patterns exhibited by humans within contextualized situations allows robots to manage uncertainty and improve performance in common scenarios.

2. Crowdsourced Task Description Subsystem 200

Figure 2C:
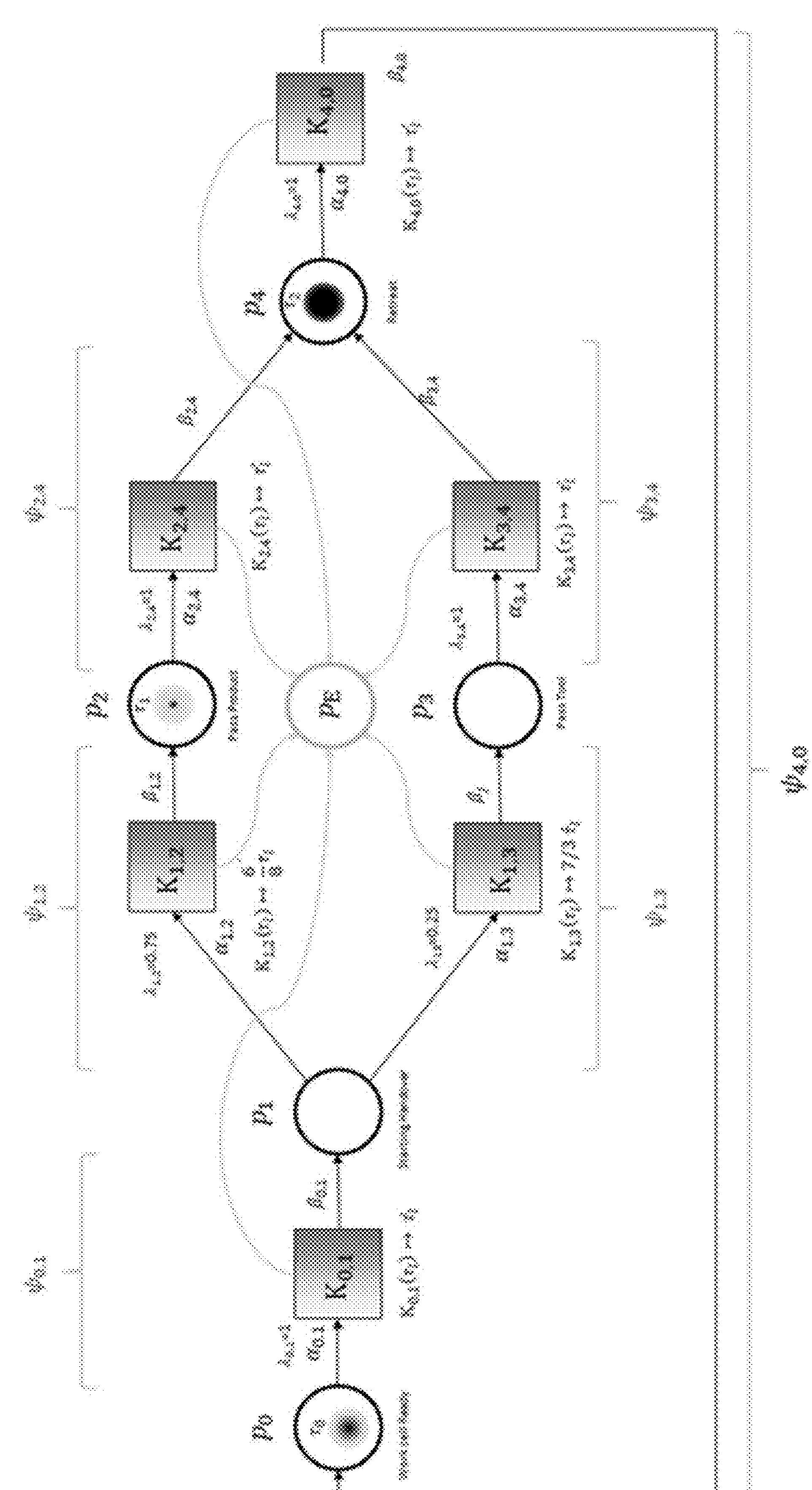

FIGS. 2A-2C illustrate a crowdsourced task description subsystem 200 in accordance with aspects of the disclosure.

FIG. 2A illustrates an example task classification table 200A listing tasks, agents objects, and collaboration mode.

An example task is packaging multiple objects into a box, sealing the box with tape, applying the parcel information label, and placing the box in the delivery area. This task is divisible into multiple sub-tasks (atomic tasks). By recursively decomposing each task and sub-task, a description that comprises a sequence of atomic tasks is obtained. These indivisible operations are parametric and reusable. Hence, an atomic task can be composed into more elaborated sub-tasks, in a hierarchical manner, to define a whole complex task. Each of the atomic tasks, involves one or more agents, and one or more objects. Depending on the requirements of the task, different agents (e.g., robot, human, actuated tools, and dynamic and instrumented infrastructure elements) and objects may be required.

The collaboration mode defines q level of collaboration for each composite task. There are three different levels of collaboration: full mode, assist mode, or none in a case where there is no collaboration and one agent is in charge of the entire task. In full mode, multiple agents actively manipulate objects to achieve a task, otherwise, the task cannot be fulfilled. In assist mode, one agent manipulates task objects, while the one or more other agents facilitate the task completion, for example by moving obstacle objects away. Without collaboration, these tasks will take longer or are impossible to execute. Consider scenarios where the human cognition and decision making capabilities direct the actions, while the robot provides the force and physical stress of the task, or the robot executes high precision or regular motions difficult to impossible to be realize by humans.

FIG. 2B illustrates an example of an assembly task 200B.

The example assembly task 200B is defined by the relevant objects and the sequence of atomic actions required to manipulate an initial scene to a desired assembled state. The example assembly task environment involves of a table in front of an agent that has to assemble a sphere into a torus (assembly task). There are also other objects in the environment. For every type of task, there are different parameters and collaboration implications. The example assembly task is specified by the two objects to be assembled (sphere and torus), their final relative positions (poses), and a sequence of actions to achieve the relative positions. For illustrative purposes, numerical parameters (e.g., directions, grasp forces, and poses) are depicted in the images as white arrows or end effector positions. Parameterization of the atomic actions is known, and for the sake of brevity, will not be described here.

The assembly process starts with finding the torus (step 200B.1), and then determining if the torus is reachable (step 200B.2). The robot end effector grasps the torus (step 200B.3.1), transports the torus (step 200B.3.2), and then places and releases the torus on the table (step 200B.3.3). The assembly process returns to find the sphere (step 200B.1), grasps the sphere (step 200B.4.1), transports (step 200B.4.2), and the places and releases the sphere in the torus (step 200B.4.3).

The sequence of atomic actions depends on the collaboration mode, which is listed in the example task classification table 200A. In full collaboration mode, both agents manipulate the objects to perform the assembly. In assist mode, objects are labeled as master and slave, and the assistant agent moves the slave object to a location which facilitates the assembly action by the agent manipulating the master object. The no collaboration mode lays out the different actions for a single robot to perform the task, including any required pre-manipulation steps.

The classifications are examples of some of the most used manipulation tasks in industrial environments. This classification may be extended to encompass other tasks that arise in different domains, such as healthcare, retail, warehousing, and service robotics.

2.1. Composed-Task Formalism: Quasi-Probabilistic Petri Network 200C

FIG. 2C illustrates an example of a formal task definition via a quasi-probabilistic petri network (or net) 200C.

Petri nets, also known as a place/transition (PT) net, is one of several known mathematical modeling languages for the description of distributed systems. A petri net is a directed bipartite graph that has two types of elements, places (tokens depicted as circles) and transitions (depicted as rectangles). The quasi-probabilistic petri net 200C disclosed herein builds on known petri nets, and may be referred to herein as a state machine.

The quasi petri net 200C is a formal method to represent, trigger, and track execution of a task in order to connect task descriptions with intent estimation and motion planning. Considering the ability to model uncertainty in the connection and triggering of the individual stages of a task, it is natural to structure the problem by a set of elements as a categorical state set, an atomic actions set, action transition functions, and behaviors modeling via multiple concurrent state beliefs as described below.

2.1.1. Categorical State Set

A categorical state set, shown in the figure as circles, defines stable configurations of all elements in the workspace, including active agents and passive elements. The state is considered categorical and not numerical because the specific values of the Degrees of Freedom (DoF) or parameters may vary slightly from one execution to another. For example, in FIG. 2C, on the left-side the setup is considered a categorical state due to the fact that all elements can be described in positions and orientations that are stable. Defining a repeatable layout of all elements. When all designed categorical states are known, an additional state called error state PE is added to manage all unpredicted eventualities. This finite collection of categorical states is referred to as P, and its cardinality is denoted as |P|. The start state is po from which the task starts its execution by having a single execution hypothesis token as described further below.

2.1.2. Atomic Actions Set

The atomic actions set is a finite collection of actions in which each element contains a pre-condition $\alpha$ to be fulfilled (a partial categorical state), and a post-condition $\beta$ as a result if, and only if, the action is completed successfully. The post-condition state affects the current categorical state transforming (implemented as the transportation of the hypothesis token) into another categorical pre-defined state, or in case the real system ends in a non-modeled state, namely not in P, then it sets the global execution state of the task to the error state at the center element PE; this is not modeled in terms of a likelihood but as exception handling mechanism. The likelihood of an action to be executed is described as a non-normalized probability, namely $0>\lambda$. The set of all atomic actions in an application domain is denoted as $T:=\{(\alpha_1, \beta_1, \lambda_1), \ldots, (\alpha_n, \beta_n, \lambda_n)\}$ as expected $n=|T|$.

2.1.3. Action Transition Functions

An action transition function, shown in the figure as rectangles, is the discrete connection subset of the Cartesian product of the categorical state set P and all the elements in the atomic action set T, namely $\Psi: =\{\psi_{i,j} \subseteq \{P \times T\}\}$, intuitively is possible to see that a particular $\psi_{i,j}$ exists in the transition function if there is at least one $p_i \in P$ that fulfils $\alpha_j \in T$ and when applied produce a $\beta_j$, effect for which there is at least one categorical state $\acute{\alpha}_j \in w\ \acute{\alpha}_j \in T$ which depicts the partial resulting state. Finally, while tracing the possible set of current states using multiple concurrent hypotheses via probabilistic tokens, the application of a transition has an identity, decay or amplification of the likelihood associated to a particular token via the update belief function $K_{i,j}(T_l \in R) \rightarrow \acute{\tau}_l \in R$ where $\tau_l$ denotes the l probabilistic token (as explained in next element of the task). The main role of the arc-wise update function $K_{i,j}$ is twofold. First, model the likelihood of being on a state according to the source and destination state. Second, to modulate the input-output associated likelihood with each token $\tau_l$. Because there is no linear nor continuous constraints on $K_{i,j}$, it is possible to obtain higher behavior expressivity than other discrete event formalisms by using this mechanism with the inherent drawback of adding design complexity of multiple $K_{i,j}$ functions. The complexity mitigation schema is to define $K_{i,j}$ as linear scalars by default and customize only those required in ambiguous transitions where the complexity of the human's mental-model and large robot set of actions (multiple branching) requires to generate a larger hypothesis set via token expansions as described next.

2.1.4. Behaviors Modeling Via Multiple Concurrent State Beliefs

Due to the complexity of the collaboration among human and robot with respect to the deviations between an observable state and real hidden state of the task, it is necessary to keep track of multiple hypotheses of what the human mental model state is and what the next transition (via an atomic action) may be. This set of hypotheses is formally a collection of probabilistic markers T flowing across the structure of the petri net, the so-called stochastic marker state. The association of a belief value per marker enables the free-form creation or destruction of tokens. The creation can be done when elements of the transition function $\psi_{i,j}$ exist with more than one element for the same set preconditions of $\alpha_j$. Inversely, categorical states that have multiple input transitions and lesser output transitions will produce a belief compression. This generalizes the blocking and coordination mechanisms of petri nets to a probabilistic flow. Furthermore, that structural behavior is modulated or exacerbated by the update belief functions $K_{i,j}$, which can take even deterministic effects by zeroing beliefs consequently disregarding the probabilistic tokens. The counter effect is not directly modeled in these update functions because the system, with respect to the integral belief, is not conservative. Therefore, the normalization of the token's beliefs into a probability distribution over the set of categorical states is the mechanism to remove spurious tokens and to rescale the beliefs as needed.

This example quasi-probabilistic petri-like network 200C shows multiple hypotheses while executing a human-robot collaboration for handover tools and product in an assembly line. The radial gradient fillings of the tokens (circles) represent diverse likelihood, with respect to density, for each concurrent hypothesis. Each of the transitions (rectangles) can possibly trigger/transport a token to the error state pr error or non-categorical state in order to model unforeseen eventualities, exceptions, malfunctions on the robot, environment, tools, goods and unplanned human motion or behaviors. This error state pr is critical for safety and feasibility in open-world applications, and thus is not part of the non-conservative density mechanism but more an exception handling and safety mechanism.

2.2. Crowdsourced Task Parameterization

It is possible to manually split and set the parameters of the quasi-probabilistic petri net 200C that is used to define high level tasks composed by sub-tasks (atomic actions). However, robots and sensorized environments (e.g., factory floor and smart traffic intersections) can capture data of moving agents and objects and transform the petric net to a common reference frame to be aggregated. Moreover, the generic task definition can be used across multiple locations by different agents, which makes crowdsourcing feasible. For example, the task described in the petri net 200C of FIG. 2C is generic enough to be used in multiple factories across different countries. However, setting the parameters for the action transition functions might require expertise and fine-tuning, which for more complex tasks can become rapidly intractable for a single human being resulting in sub-optimal parameterizations.

The transition functions and other parameter values are therefore obtained from a crowdsourced evolutionary method. For the same task description used across multiple factories, efficiency metrics are added to the task description to measure the performance of each of the sub-tasks (atomic tasks) and the overall general task. The crowdsourced task description is then used to compute a distribution over the parameters which can be obtained by density estimation methods. A gradient-free optimization, such as Covariance Matrix Adaptation Evolutionary Strategy (CMA-ES), is used to propose the next values for the parameters to be used and the results after one execution are sent back by all the platforms that participate in the crowdsourced optimization process. Eventually the evolutionary strategy converges to an optimized parameterization, and the evolution can be stopped. However, due to its low computational burden, the optimization process can be executed continuously, and the task parameterization can gradually adapt to changes on how the tasks are performed.

3. Manipulation and Moving Path Intent Prediction Subsystem 300

FIGS. 3A-3E illustrate manipulation and moving path intent prediction subsystem 300 in accordance with aspects of the disclosure.

An important component of this manipulation and moving path prediction relies on the human manipulation intent prediction capability. Human intent is represented by a probability distribution over a set of trajectories that a human is likely to perform, as explained with respect to the quasi petri net of FIG. 2C, while executing a specific action during a task. In order to infer intent, therefore, the robot must keep track of the task progression. A task is first decomposed into a sequence of elemental/atomic subtasks, as explained above. This sequence could have stochasticity in it. For example, if a sub-task involves fitting four screws into an object, the order of the screws can be chosen randomly (e.g., 1-2-3-4, 1-3-2-4, 1-2-4-3, etc.). For each subtask, the robot maintains a prior distribution over the set of plausible trajectories for the given sub-task. Intent prediction involves, therefore, joint inference over the task and trajectory space, which can be broken down as follows:

$$p(\text{trajectory}, \text{task}_n|\text{task}_{n-1}, \ldots, \text{task}_0) \propto p(\text{trajectory}|\text{task}_n) \times p(\text{task}_n|\text{task}_{n-1}, \ldots, \text{task}_0) \quad \text{(Equation 1)}$$

This Equation 1 uses recursive Bayesian filtering techniques to perform joint inference. The inferred posterior can be further used by the motion planning subsystem, described in section 4 below. Due to the complexity of the distributions involved, approximate Bayesian techniques are applied. The variable of interest to be estimated $Z\in\mathbb{R}^3$ is the human reaching target goal coordinate in the task space, constrained to the workspace volume. The sensor observation $X\in\mathbb{R}^{s\times3}$ is the hand trajectory, which consists of a sequence of "s" samples of the hand position. To obtain a set of likely trajectories that will define the intent Probability Density Function (PDF), approximate Bayesian computations are performed, using as inputs information from the sensor subsystem, described in section 5 below and task definition described in section 2.

FIG. 3A illustrates an example of task-aware intent prediction 300A. Intent is predicted as a set of trajectories from a current hand position to a target location indicated by the black dashed lines. The left-hand side of the figure illustrates a set of predicted trajectories for a task including placing the red ball into the torus. It can be seen that most of the trajectories at in the ball. The right-hand side of the figure illustrates a set of predicted trajectories for the same task after the ball has been secured in the torus.

FIG. 3B illustrates a block diagram of prediction generation 300B.

3.1. Obtaining Task Priors 310B

The task definition includes the objects that are involved in the task. Moreover, objects are likely to be manipulated in a specific sequence depending on the task, this is also modelled by the prior Probability Density Function (PDF). The prior PDF is computed as a mixture model of a uniform distribution on the entire workspace, and Gaussian kernels centered on each object. The weights of the mixture model depend on the task state and the sequence in which objects are supposed to interacted in the task definition. Similarly, when the subtasks include traversing the space by navigating the environment from one point to another point, the task priors can be obtained by querying a dynamic map.

Figure 3C:
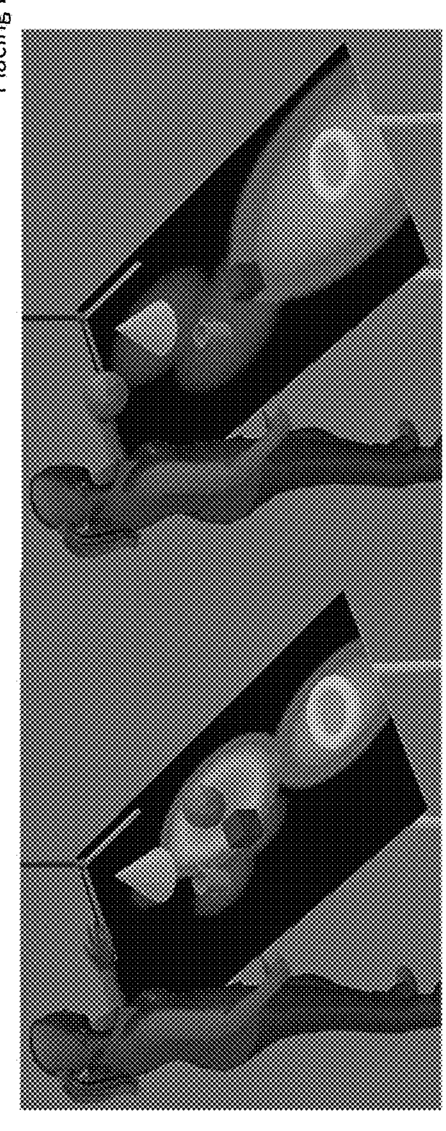

FIG. 3C illustrates task priors for a task including placing the ball inside the torus. The left-hand side of the figure illustrates task priors before the ball has been grasped. It can be seen that intent is more concentrated in the expected target object (ball), and the other objects have less prior likelihood of being the intent of the manipulation. The right-hand side of the figure illustrates the task priors after the ball has been secured by the human. In this case, prior likelihood is concentrated around the torus.

Figure 3D:
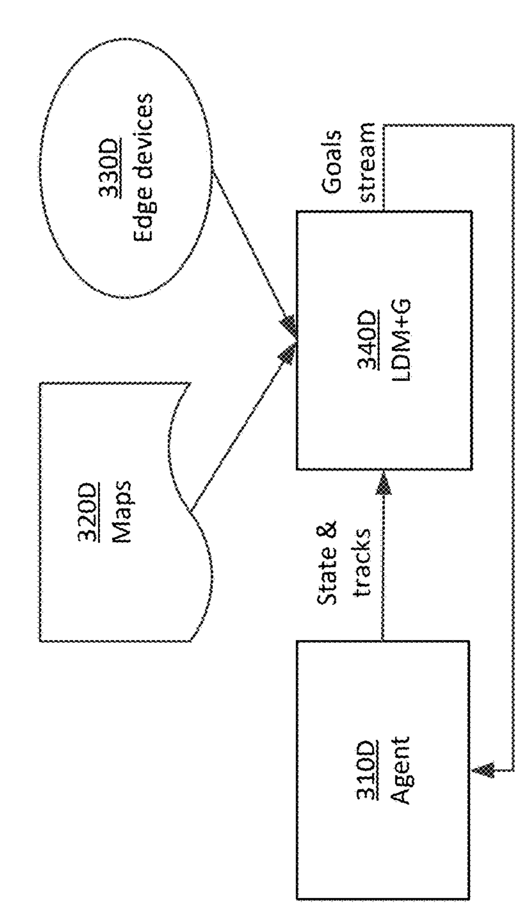

FIG. 3D illustrates a schematic of a Local Dynamic Map (LDM) 300D, enhanced with a goal predictor G (LDM+G), for building a generative model for a navigation environment (e.g., an autonomous vehicle and non-motorized road user such as a pedestrian).

In intelligent transportation systems, a LDM is a conceptual data store in an Intelligent Transport System (ITS) station, which integrates Geographic Information System (GIS) maps, sensor data and Vehicle-to-Everything (V2X) messages. The LDM has of four layers representing permanent static information at the bottom and highly dynamic fast-changing information at the top. The implementation of the LDM is outside the scope of this disclosure, but a semantically enriched LDM is assumed and includes ontologies and related data access methods for efficient information retrieval at query time while keeping the amount of stored data small.

The LDM 300D takes existing high definition maps 320D and messages from edge devices 330D, including other agents, to construct a representation of the static and dynamic elements in the scene. At query time, the agent 310D inputs its current state and a list of tracks. Each track is a tuple $(v,p_n)$, where v is a task-dependent track identity and $p_n$ is a trajectory represented as a list of n time-stamped spatial positions and headings. The output of the LDM+G 340D is a list of goals, where each goal is a tuple (v,x,l), and v is a pair of identities, $\{v_e,v_m\}$ corresponding to the identities used by the agent and the LDM, respectively. The time-stamped pose, x, is the goal and the scalar l is the likelihood assigned to the goal.

The goals G are obtained by the sampler from the goal distribution stored in the cloud. The goals Gcan be generated based on prior semantic information as well as from past tracks from the planning agent or crowdsourced from other agents. For example, if the current task involves motion on the factory floor, the goal distribution can be initialized by a distance transform to lane intersections, lane edges, building doors, ramps, or other terminal regions as indicated by semantics of a map. When a track is inactive for a certain period of time, the terminal position, or some intermediate position, can be sent back to the cloud to update the goal distribution.

The LDM can be implemented in the cloud or in the agent 310D itself. When a new goal G is confirmed, the new goal G can be shared with other agents, for example, by sending a decentralized environmental notification message (DENM) to confirm a goal G means that it has been saved in the LDM as described above and the likelihoods of the local goals have been updated. The last step involves incrementing the probability of the observed goal G by a certain amount and decrementing the probability of the other local goals, consistent with the starting position, by the same amount.

3.2. Generative Model 320B

The generative model 320B is configured to create observations using as input values from the variable of interest.

Thanks to the generated data, the likelihood function 330B can be computed to determine how well the generated data explains the observations and used to iterate in sampling the posterior distribution of the inferred variable. Examples of generated trajectories are depicted as dotted lines in FIG. 3A.

In an example embodiment, the generative model 320B consists of a kinematic model of the task environment, and a nine-DoF (Degrees of Freedom) model of a human torso and left arm whose joint limits and dimensions that of an average adult. The kinematic model is loaded into a physics engine and trajectories are generated by simulating hand trajectories. The arm motion is obtained by a Jacobian pseudo-inverse $J^\dagger$ that transforms task space velocities $\dot{x}$ into joint space velocities $\dot{\theta}$. $\dot{x}$ is obtained by means of a PID controller:

$$e(t)=x_{des}(t)-x(t) \quad \text{(Equation 2)}$$

$$\dot{x}(t) = K_p e(t) + K_i \int_0^t e(t) + K_d \frac{de(t)}{dt} - K_{rep} x_{obs} \quad \text{(Equation 3)}$$

that attracts the hand position x to the target location $x_{des}$ and a Force Field controller, represented by $K_{rep}x_{obs}$, that pushes the hand away from obstacles $x_{obs}$. The controller gains ($K_p$, $K_i$, $K_d$, $K_{rep}$) are heuristically tuned to provide smooth motion and goal convergence. The redundant degrees of freedom are used to maintain a human-like posture while the trajectory is being executed. To do so, a second joint position objective $\theta_{sec}$ is projected into the controller using the nullspace of the Jacobian pseudo-inverse Null ($J^\dagger$):

$$\theta(t)=J^\dagger\dot{x}+(\theta_{sec}-\theta(t))\text{Null}(J^\dagger). \quad \text{(Equation 4)}$$

Figure 3E:

FIG. 3E illustrates an example of a trajectory generation approach 300E based on current observation and obstacles. When executing a navigation task. In this case, the goal is to predict the moving trajectory of several agents in order to plan accordingly and perform the navigation task collaboratively without disturbing the trajectories of other agents. In order to do so, the generative model 320B uses a stochastic path planner, such as a rapidly exploring Random Trees or Probabilistic Road Maps, but is not limited in this respect. The obstacles represented in the scene are fused into an occupancy map, which is used as the planning space. The plan is computed by setting the sampled goals as the target position and the last detected agent position as starting point. Both planners use a heuristic function in order to find an asymptotically optimal path. The heuristic function can be tuned depending on the type of agent, dynamic model and risk models. For example, if the agent is a pedestrian detected in a region were people usually run, the heuristic function will consider using an increased velocity motion model. Also, the sampling distributions are defined in the scene depending on the risk models. For example, at an intersection it is more probable for people to walk on the zebra crossing, thus, the end points of the zebra crossing have increased likelihood of being selected as goal points.

3.3 Likelihood Function Surrogate 330B

The likelihood function 330B is configured to determine how likely it is to observe the data considering the current model. However, it is common that likelihood function is unknown or cannot be computed, in those cases a good solution is to use a proxy likelihood function that acts as a surrogate, which is denoted as p (x'|x). This function has an important impact on the accuracy of predictions that can be obtained. An example embodiment is a multivariate Gaussian distribution, this function is especially suited for the task because it can be easily interpreted as a PDF given that it integrates to 1. Other possible distances that can be used are the Hausdorff distance, Frechet distance and Chamfer distance. After each new observation sample, a multivariate Gaussian with s×3 dimensions is constructed and its mean is set to the observed hand points (from t=0 to t), the covariance is set to $\sigma I^{s\times3}$, where sigma is a parameter that is tuned depending on the application, and $I^{s\times3}$ is the identity matrix with s×3 dimensions. Therefore, the likelihood of a sample can be computed as:

$$L(x')=N(x'_{0:t}|x_{0:t},\sigma I). \quad \text{(Equation 5)}$$

Where the sub-indices of the observations denote that the trajectory that is compared is truncated to match the number of observed points from the trajectory that is being used to compute the predictions. The likelihood function (or its surrogate) serves another important purpose, it provides a measure of uncertainty (or equivalent confidence) in the predicted outcome. An outcome with high uncertainty can be used to flag anomalous trajectories, which could occur due to distributional shift from the previously observed data, or due to new/unknown obstacles, or a wrong action taken by the human agent. In such cases, the robot can fall back into no-assist mode and give full control to humans while explaining the reason behind (e.g., a non-expected or unpredictable motion was observed). This will enable safer human-robotic collaboration and avoid catastrophic results when the robotic system is not confident about its trajectory prediction.

In the navigation embodiment, the likelihood represents the probability that x is the intended goal conditioned on the partially observed trajectory represented by a track (v,pn). Moreover, it is important to remark that the likelihood is also conditioned on environmental factors such as the layout, obstacles and risk map that influenced the generative model. The likelihood of a goal x is obtained by evaluating a Multivariate Gaussian distribution (denoted by N) centered at p and with e scaling:

$$L(x')=N(g(x')_{0:n}|p_n,\Sigma) \quad \text{(Equation 6)}$$

Where g(·)0:n represents our planning-based generative model (see FIG. 1, generative model block), that generates trajectory candidates conditioned by contextual factors. The subindex, indicates that the generated trajectory is truncated to match the number of observed points in the trajectory pn, which is the sequence of observed time-stamped poses. This formulation includes a risk parameter Σ being controlled externally by the risk models. Σ is a covariance matrix that expresses the expected variation on each of the dimensions. Note that each track may have multiple goals assigned with different likelihood values, which represent the predictive distribution of the goals conditioned on the contextual information and observed tracks.

3.4 Sampling Algorithm 340B

As seen in the previous section, the likelihood of a sample point z is evaluated using the generated trajectory x', truncated to match the current observation length from $t_0$ to t. The ability to evaluate a sample likelihood allows the computation of samples that are distributed like the target posterior distribution (i.e., the predicted intent) to approximate. There are multiple sampling algorithms that can be used to obtain samples from the posterior. The most common approach, Markov Chain Monte Carlo (MCMC) with Metropolis-Hastings (MH) update is a well-known approach that is easy to implement, general, unbiased and has convergence guarantees. However, MCMC-MH is not easily parallelizable, can reject a lot of samples wasting computational time and it is challenging to fulfill real-time prediction constraints. To address those problems, in this idea we propose the combination of importance sampling with a stratified sampling approach that consists on the creation of a grid and strategically sampling grid cells following a Latin hypercube strategy. This opens the door to massive parallelism that can tackle the real-time constraints by increasing the computational power. Importance sampling adds a set of importance weights to the resulting posterior samples that indicate how relevant each sample is. This can be used to reconstruct the posterior by considering the weight when using a mixture model or other non-parametric density estimators.

4. Intent and Task Aware Motion Planning Subsystem 400

In the context of robotic manipulation, existing motion planning algorithms generally use as input a target position, defined in the 6D task space. Additionally, the robot geometric and kinematic model is often required together with a representation of the obstacles in the workspace. With that information, the motion planner is able to generate a trajectory (e.g., a sequence of timestamped positions) that the robot should traverse in order to safely reach the desired target without violating the planner constraints (e.g., obstacle minimum distance). Using the described motion planning capabilities as a backbone, this idea uses the task description to determine the planning goal and introduces the human intent density function as a goal attractor or repeller depending on the task being executed.

5. Robot Controller Subsystem 120 and Workspace Perception Subsystem 130

Referring back to FIG. 1, the final step is to instruct the robot controller subsystem 120, with robot perception subsystem 130, taking into consideration the environment and workspace perception subsystem 110.

Figure 4:
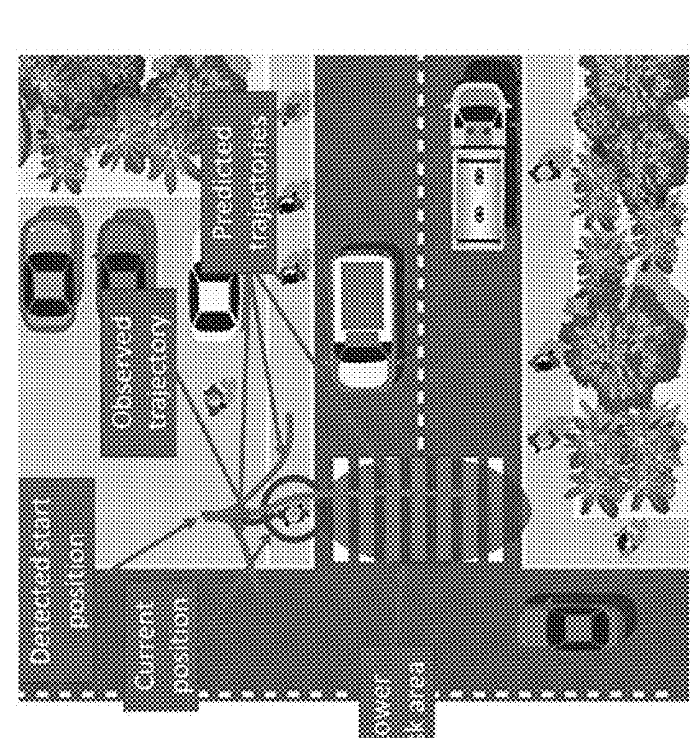
FIG. 4 illustrates an example of a human-robot collaboration workspace with multiple sensors of an intent and task aware motion planning subsystem in accordance with aspects of the disclosure.

FIG. 4 illustrates an example of human-robot collaboration workspace with multiple sensors in the intent and task aware subsystem 400. Cameras Cam 0-7 are calibrated intrinsically and extrinsically, that is, each camera position and orientation with respect to the task frame is known. The cameras Cam 0-7 detect the human and its joint configuration, which can be expressed in the task frame.

The collaborative task execution system requires information about 1) position and orientation of objects in the scene, 2) position, orientation, and joint configuration of humans in the workspace, and 3) an environment occupancy map. This idea relies on existing methods to obtain the required perceptual information (also known as percepts) and is not limited by the specific sensor suite used to provide the percepts. The sensor suite may be a combination of multispectral cameras, LIDAR, RADAR, SONAR, RFID, thermal and depth cameras, to name a few. Depending on the specific deployment, different sensor fusion methods are implemented to combine the perceptual information provided from the different sensors. An example embodiment of a perception system is depicted in FIG. 4, where the different percepts are obtained from several depth cameras which are calibrated intrinsically (focal length and distortion model) and extrinsically (i.e., the relative positions of the cameras with respect to the workspace are known). The percepts obtained from each camera are combined with a percept-specific approach. Occupancy information is fused using a probabilistic occupancy grid, as is known, object pose is fused by using Bayesian Filters (e.g., Unscented Kalman Filter, as is known), and human pose is fused directly in the joint space by combining the probability distributions from the different detections in a mixture model.

Figure 5:
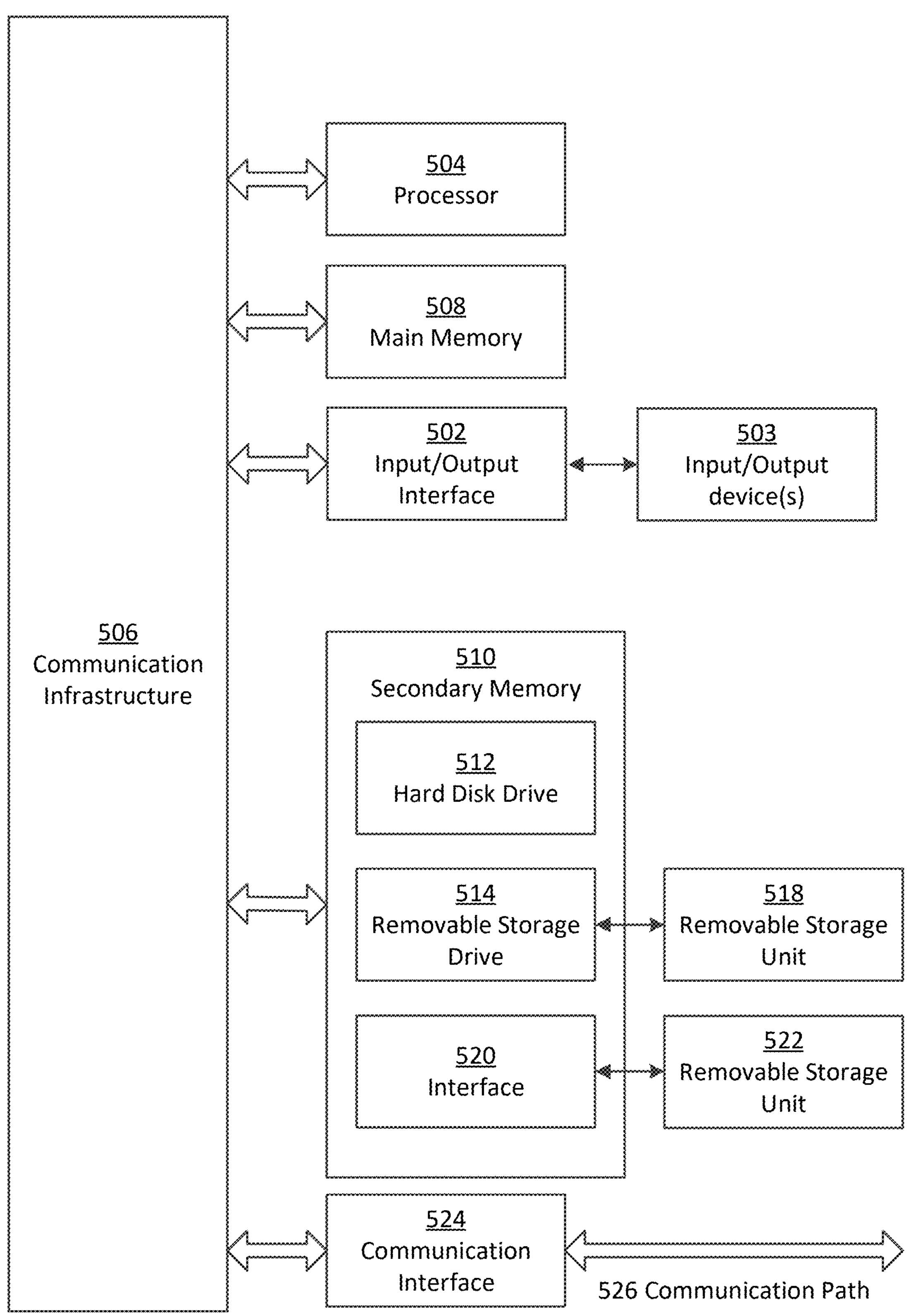
FIG. 5 illustrates a typical computer system for implementing the aspects of the disclosure.

FIG. 5 is a typical computer system 500 for implementing the aspects of the disclosure.

Computer system 500 includes one or more processors (also called central processing units, or CPUs), such as a processor 504. Processor 504 is connected to a communication infrastructure or bus 506.

One or more processors 504 may each be a graphics processing unit (GPU). In an aspect, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary aspect, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an aspect, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 515 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, aspects may operate with software, hardware, and/or operating system implementations other than those described herein.

The aspects of this disclosure increase productivity of robot-assisted tasks. The disclosed aspects of robust probabilistic integration of tasks specification, human intent, and motion planning, have the potential to create value with multiple points of direct and indirect impact. First, the aspects will increase the number of robots in manufacturing environments, and gradually other domains such as healthcare, retail, and warehousing. An increase in deployed autonomous robots implies an increase in sensing (Realsense), computing (edge and cloud), and communications (5G, WiFi6) capabilities in those scenarios. The disclosed aspects also create opportunities for other products, such as multi-purpose accelerators (e.g., FPGAs) for perception and motion planning. Additionally, companies that have manufacturing processes (e.g., car manufacturers) can increase the level of automation of their production lines by including human-robot collaboration. Finally, highly-collaborative tasks will also be relevant to warehousing-based companies.

The techniques of this disclosure may also be described in the following examples.

Example 1. A human-robot collaboration system, comprising: at least one processor; and a non-transitory computer-readable storage medium including instructions that, when executed by the at least one processor, cause the at least one processor to: predict a human atomic action based on a probability density function of possible human atomic actions for performing a predefined task; and plan a motion of the robot based on the predicted human atomic action.

Example 2. The human-robot collaboration system of claim 1, wherein the predefined task is defined by a state machine comprising: a set of categorical states of stable configurations of elements in a scene, wherein the possible human atomic actions navigate between the categorical states; and a dynamic probability density function of the possible human atomic actions at respective categorical states of the state machine.

Example 3. The human-robot collaboration system of claim 1, wherein the instructions further cause at least one processor to: parameterize the dynamic probability density function based on crowdsourced data of behavioral patterns exhibited by humans performing the predefined task.

Example 4. The human-robot collaboration system of claim 1, wherein the instructions further cause the at least one processor to: parameterize the dynamic probability density function based on a prior human atomic action.

Example 5. The human-robot collaboration system of claim 1, wherein the dynamic probability density function is non-conservative.

Example 6. The human-robot collaboration system of claim 1, wherein a sequence of human atomic actions of the predefined task depends on the predefined task's collaboration mode.

Example 7. The human-robot collaboration system of claim 1, wherein the instructions further to cause the at least one processor to: generate the dynamic probability density function of the possible human atomic actions using a generative model.

Example 8. The human-robot collaboration system of claim 7, wherein the generative model considers a prior human atomic action.

Example 9. The human-robot collaboration system of claim 7, wherein the generative model comprises an obstacle avoidance factor.

Example 10. The human-robot collaboration system of claim 1, wherein the robot is an autonomous vehicle and the generative model predicts non-motorized road user behavior.

Example 11. A non-transitory computer readable medium having stored thereon instructions that, when executed by at least one processor, cause the at least one processor of a human-robot collaboration system to: predict a human atomic action based on a probability density function of possible human atomic actions for performing a predefined task; and plan a motion of the robot based on the predicted human atomic action.

Example 12. The non-transitory computer readable medium of claim 11, wherein the predefined task is defined by a state machine comprising: a set of categorical states of stable configurations of elements in a scene, wherein the possible human atomic actions navigate between the categorical states; and a dynamic probability density function of the possible human atomic actions at respective categorical states of the state machine.

Example 13. The non-transitory computer readable medium of claim 11, wherein the instructions further cause the at least one processor to: parameterize the dynamic probability density function based on crowdsourced data of behavioral patterns exhibited by humans performing the predefined task.

Example 14. The h non-transitory computer readable medium of claim 11, wherein the instructions further cause the at least one processor to: parameterize the dynamic probability density function based on a prior human atomic action.

Example 15. The non-transitory computer readable medium of claim 11, wherein the dynamic probability density function is non-conservative.

Example 16. The non-transitory computer readable medium of claim 11, wherein a sequence of human atomic actions of the predefined task depends on the predefined task's collaboration mode.

Example 17. The non-transitory computer readable medium of claim 11, wherein the instructions further to cause the at least one processor to: generate dynamic probability density function of the possible human atomic actions using a generative model.

Example 18. The non-transitory computer readable medium of claim 17, wherein the generative model considers a prior human atomic action.

Example 19. The non-transitory computer readable medium of claim 17, wherein the generative model comprises an obstacle avoidance factor.

Example 20. The non-transitory computer readable medium of claim 11, wherein the robot is an autonomous vehicle and the generative model predicts non-motorized road user behavior.

Example 21. A human-robot collaboration system, comprising: a prediction means for predicting a human atomic action based on a probability density function of possible human atomic actions for performing a predefined task; and a planning means for planning a motion of the robot based on the predicted human atomic action.

Example 22. The human-robot collaboration system of claim 21, wherein the predefined task is defined by a state machine comprising: a set of categorical states of stable configurations of elements in a scene, wherein the possible human atomic actions navigate between the categorical states; and a dynamic probability density function of the possible human atomic actions at respective states of the state machine.

Example 23. The human-robot collaboration system of claim 22, wherein the instructions further cause the at least one processor to: parameterize the dynamic probability density function based on crowdsourced data of behavioral patterns exhibited by humans performing the predefined task.

The detailed description refers to the accompanying drawings that show, by way of illustration, exemplary details in which the aspects of the disclosure may be practiced. In the description, numerous specific details are set forth in order to provide a thorough understanding of the aspects of the present disclosure. However, it is apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

The invention claimed is:

1. A human-robot collaboration system, comprising:

at least one processor; and a non-transitory computer-readable storage medium including instructions that, when executed by the at least one processor, cause the at least one processor to:

predict a human atomic action by applying a probability density function over a set of possible human atomic actions associated with a predefined task, wherein each human atomic action is defined by pre-conditions specifying a required stable configuration of an element in a scene and post-conditions specifying a resulting stable configuration of the element in the scene after completion of that action;

plan a motion of the robot based on the predicted human atomic action; and generate an instruction to cause the robot to perform the motion.

2. The human-robot collaboration system of claim 1, wherein the predefined task is defined by a state machine comprising:

a set of categorical states of stable configurations of elements in a scene, wherein the possible human atomic actions navigate between the categorical states; and a dynamic probability density function of the possible human atomic actions at respective categorical states of the state machine.

3. The human-robot collaboration system of claim 2, wherein the instructions further cause at least one processor to:

parameterize the dynamic probability density function based on crowdsourced data of behavioral patterns exhibited by humans performing the predefined task.

4. The human-robot collaboration system of claim 2, wherein the instructions further cause the at least one processor to:

parameterize the dynamic probability density function based on a prior human atomic action.

5. The human-robot collaboration system of claim 2, wherein the dynamic probability density function is non-conservative.

6. The human-robot collaboration system of claim 1, wherein a sequence of human atomic actions of the predefined task depends on the predefined task's collaboration mode.

7. The human-robot collaboration system of claim 2, wherein the instructions further cause the at least one processor to:

generate the dynamic probability density function of the possible human atomic actions using a generative model.

8. The human-robot collaboration system of claim 7, wherein the generative model considers a prior human atomic action.

9. The human-robot collaboration system of claim 7, wherein the generative model comprises an obstacle avoidance factor.

10. The human-robot collaboration system of claim 7, wherein the robot is an autonomous vehicle and the generative model predicts non-motorized road user behavior.

11. A non-transitory computer readable medium having stored thereon instructions that, when executed by at least one processor, cause the at least one processor of a human-robot collaboration system to:

predict a human atomic action by applying a probability density function over a set of possible human atomic actions associated with a predefined task, wherein each human atomic action is defined by pre-conditions specifying a required stable configuration of an element in a scene and post-conditions specifying a resulting stable configuration of the element in the scene after completion of that action;

plan a motion of the robot based on the predicted human atomic action; and generate an instruction to cause the robot to perform the motion.

12. The non-transitory computer readable medium of claim 11, wherein the predefined task is defined by a state machine comprising:

a set of categorical states of stable configurations of elements in a scene, wherein the possible human atomic actions navigate between the categorical states; and a dynamic probability density function of the possible human atomic actions at respective categorical states of the state machine.

13. The non-transitory computer readable medium of claim 12, wherein the instructions further cause the at least one processor to:

parameterize the dynamic probability density function based on crowdsourced data of behavioral patterns exhibited by humans performing the predefined task.

14. The non-transitory computer readable medium of claim 12, wherein the instructions further cause the at least one processor to:

parameterize the dynamic probability density function based on a prior human atomic action.

15. The non-transitory computer readable medium of claim 12, wherein the dynamic probability density function is non-conservative.

16. The non-transitory computer readable medium of claim 11, wherein a sequence of human atomic actions of the predefined task depends on the predefined task's collaboration mode.

17. The non-transitory computer readable medium of claim 11, wherein the instructions further cause the at least one processor to:

generate dynamic probability density function of the possible human atomic actions using a generative model.

18. The non-transitory computer readable medium of claim 17, wherein the generative model considers a prior human atomic action.

19. The non-transitory computer readable medium of claim 17, wherein the generative model comprises an obstacle avoidance factor.

20. The non-transitory computer readable medium of claim 17, wherein the robot is an autonomous vehicle and the generative model predicts non-motorized road user behavior.

21. A human-robot collaboration system, comprising:

a prediction means for predicting a human atomic action by applying a probability density function over a set of possible human atomic actions associated with a predefined task, wherein each human atomic action is defined by pre-conditions specifying a required stable configuration of an element in a scene and post-conditions specifying a resulting stable configuration of the element in the scene after completion of that action;

a planning means for planning a motion of the robot based on the predicted human atomic action; and instruction generation means for generating an instruction to cause the robot to perform the motion.

22. The human-robot collaboration system of claim 21, wherein the predefined task is defined by a state machine comprising:

a set of categorical states of stable configurations of elements in a scene, wherein the possible human atomic actions navigate between the categorical states; and a dynamic probability density function of the possible human atomic actions at respective states of the state machine.

23. The human-robot collaboration system of claim 22, further comprising:

a parameterization means for parameterizing the dynamic probability density function based on crowdsourced data of behavioral patterns exhibited by humans performing the predefined task.

24. The human-robot collaboration system of claim 1, wherein the predefined task is represented using a quasi-probabilistic Petri network that maintains multiple concurrent state beliefs via probabilistic tokens.

* * * * *